(12) United States Patent
Zhang et al.

(10) Patent No.: US 9,887,576 B2
(45) Date of Patent: Feb. 6, 2018

(54) INDUCTIVE CHARGING HOLSTER FOR POWER TOOLS IN MOBILE APPLICATIONS

(71) Applicants: Robert Bosch Tool Corporation, Broadview, IL (US); Robert Bosch GmbH, Stuttgart (DE)

(72) Inventors: Yizhuo Zhang, Arlington Heights, IL (US); Marco Laubach, Wheeling, IL (US); Steve Cole, Lombard, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 25 days.

(21) Appl. No.: 14/970,765

(22) Filed: Dec. 16, 2015

(65) Prior Publication Data

US 2016/0190858 A1    Jun. 30, 2016

Related U.S. Application Data

(60) Provisional application No. 62/096,617, filed on Dec. 24, 2014.

(51) Int. Cl.
| | | |
|---|---|---|
| *H02J 7/00* | (2006.01) | |
| *H02J 7/02* | (2016.01) | |
| *H02J 7/04* | (2006.01) | |
| *H02J 50/00* | (2016.01) | |

(52) U.S. Cl.
CPC ............ *H02J 7/025* (2013.01); *H02J 7/0045* (2013.01); *H02J 7/04* (2013.01); *H02J 50/00* (2016.02)

(58) Field of Classification Search
CPC .... H02J 5/005; H02J 7/025; H02J 7/35; H02J 50/00–50/90; H02J 7/02; H02J 17/00; H04B 5/00
USPC .......................................................... 320/108
See application file for complete search history.

(56) References Cited

U.S. PATENT DOCUMENTS

| | | |
|---|---|---|
| 2,860,929 A | 11/1958 | Gussack |
| 5,144,217 A | 9/1992 | Gardner et al. |
| 5,959,433 A | 9/1999 | Rohde |
| 8,294,300 B2 | 10/2012 | Cook et al. |
| 8,482,160 B2 | 7/2013 | Johnson et al. |
| 2008/0079388 A1 | 4/2008 | Sarnowsky et al. |
| 2009/0212737 A1* | 8/2009 | Johnson ................. A47B 96/02 320/108 |
| 2010/0062731 A1 | 3/2010 | Ham et al. |
| 2013/0088193 A1 | 4/2013 | Chen |
| 2013/0113419 A1 | 5/2013 | Lowles |
| 2013/0237173 A1* | 9/2013 | Saur ........................ H02J 7/025 455/344 |
| 2015/0357683 A1* | 12/2015 | Lohr ....................... H01F 38/14 320/108 |
| 2016/0226296 A1* | 8/2016 | Bae .......................... H02J 5/00 |

FOREIGN PATENT DOCUMENTS

| | | |
|---|---|---|
| WO | 2014096037 A2 | 6/2014 |
| WO | 2014096048 A2 | 6/2014 |
| WO | 2014096052 A2 | 6/2014 |

OTHER PUBLICATIONS

International Search Report and Written Opinion corresponding to PCT Application No. PCT/US2015/067019, dated Apr. 12, 2016 (13 pages).

* cited by examiner

*Primary Examiner* — Arun Williams
(74) *Attorney, Agent, or Firm* — Maginot Moore & Beck LLP

(57) ABSTRACT

A wireless charging system for charging a tool includes a tool holder and charging module. The tool holder includes a mounting interface, a holding portion extending from the mounting interface, and at least one surface t configured to mount the tool holder onto a support surface, such as of a mobile structure. The charging module is mounted in the mounting interface, and includes an inductive charging device that wirelessly charges a tool resting on the charging module. The holding portion is configured to at least partially engage the tool and act as a transverse support relative to the mounting interface. The at least one surface can include a base of the tool holder for horizontal mounting, a side of the tool holder for vertical mounting, or two opposite sides of the tool holder for mounting on a mounting rail.

20 Claims, 8 Drawing Sheets

INDUCTIVE CHARGING HOLSTER FOR POWER TOOLS IN MOBILE APPLICATIONS

RELATED APPLICATION

This Application claims priority to U.S. Provisional Application No. 62/096,617 filed on Dec. 24, 2014, entitled "INDUCTIVE CHARGING HOLSTER FOR POWER TOOLS IN MOBILE APPLICATIONS," the disclosure of which is incorporated by reference herein in its entirety.

TECHNICAL FIELD

This disclosure relates generally to wireless chargers, and, more particularly, to wireless chargers for power tools in mobile applications.

BACKGROUND

A common problem associated with the use of electronic devices and tools is the necessity of powering such electronic devices. Power cords connected to an external power source provide sufficient power, but are an obtrusive and problematic interference, especially with regard to power tools which are desirably easily manipulated in and around workspaces that are often crowded and obstructed.

Further, power cords and external power sources adapted for use with power tools are typically unavailable for power tools in mobile applications. For example a user may need a power tool in a variety of locations, and it may be unfeasible to feed a power connection to each location. Additionally, a power source compatible with the power tool and/or an unobtrusive power cord may not be available at the job site.

Rechargeable systems for cordless tools are a common alternative to corded tools. Such systems typically include a removable rechargeable battery and a charging station. When depleted, a rechargeable battery can be removed from the tool and inserted into the charging station for charging. U.S. Pat. No. 5,144,217 describes a cordless tool battery housing and charging system that accommodates a variety of sizes and power charges of different batteries via a controlled wired charging process. Where a definition or use of a term in a reference is inconsistent or contrary to the definition of that term provided herein, the definition of that term provided herein applies and the definition of that term in the reference does not apply. Such technologies as in U.S. Pat. No. 5,144,217 typically require not only removal of the battery from the tool in order to initiate charging, but also require a wired contact connection between the battery and charging station, which may be susceptible to damage due to, for example, moisture, dirt, or physical damage that prevents the battery from optimally coupling with the charging station.

Technology has been developed in an effort to alleviate these concerns via inductive or wireless charging. U.S. Pat. No. 8,482,160 describes a system whereby a plurality of wireless charging modules are placed underneath a workspace in order to inductively charge a secondary tool placed on the workspace in a region of one of the modules. However, such a system is expensive and complex to install, only enables wireless charging at the fixed regions of the modules, does not ensure that a tool is optimally located within a charging region for optimal charging, and is inapplicable to mobile applications. Further, such a system does not provide protection against a tool being unintentionally jostled and relocated during charging. For instance, a user might place a tool near a charging module with the expectation that the tool will charge. The user might then continue work with another device or tool, and in so doing, unintentionally move the tool away from the module, such that when the user again wishes to use the tool, it has not been charged as desired.

Other types of wireless charging devices have also been developed for charging tools and other devices, and typically resemble a pad on which a device is rested to initiate charging. However, such chargers present undesirable use cases when used as a tool resting surface since they are not secured to a supporting surface, nor do they secure the tool itself from unintended motion or vibration.

In one such undesirable use case, a user is operating a power drill powered by a rechargeable battery. When the battery becomes depleted, the drill becomes inoperable. In order to resume work, the user can, for example, replace the depleted battery with a charged replacement battery, or place the battery and/or tool onto a charging station and wait for the battery to recharge. Replacing the battery requires the user to obtain, store, and maintain charging for multiple batteries, which increases the expense and complexity of operating the drill, and waiting for the battery to recharge can necessitate delays in workflow before the user can resume drilling.

Additionally, conventional wireless charging stations do not guide an optimal location of the battery/tool for optimized charging, and do not secure the battery/tool in place. As a result, the battery/tool that is not optimally placed on a wireless charging station may charge slower or may fail to completely charge. Even if optimally placed, the battery/tool may become dislodged or moved due to inadvertent contact from the user, another tool or object, or other external forces such as vibrations from machinery. In another example, a charging station is positioned in a vehicle, and a battery/tool is placed thereon for charging. During transport, motion from the vehicle can jostle the battery/tool out of position and hinder or prevent charging. These types of impacts, jostling, and vibrations can also result in damage to the battery/tool when the battery/tool is unsecured.

Furthermore, the difficulties in providing external power to power tools described above also apply to providing external power to a charging station. In other words, while the tool itself may be able to operate for a short period without a wired connection, the charging station for the tool still needs to be provided with power to charge the tool. This means that the charging station presents the same risks and concerns due to obtrusive power cords as corded tools, in addition to the other deficiencies discussed above. One result has been that users obtain multiple rechargeable batteries, so that a depleted battery can be replaced even if the charging station is not available to provide power. However, maintaining multiple batteries is expensive, and may lead to cases where a user believes a battery is charged when it is not.

Therefore, what is needed is a way of maintaining a charge of a battery for a power tool such that the power tool is always in a ready-to-use condition. Additionally, what is needed is a way of charging a battery of a tool in mobile applications without interrupting its use or obstructing a workspace with cords or a charging station in such a way that optimally positions the tool for charging and protects against external motion and unintentional interruption of charging of the tool.

SUMMARY

The following is a brief summary of subject matter described in greater detail herein. This summary is not intended to be limiting as to the scope of this disclosure or to the claims.

In order to facilitate the use of a power tool in mobile applications, a wireless charging system includes a tool holder, a docking frame, and a charging module. The tool holder includes a first mounting interface, a holding portion that extends from an end region of the mounting interface, and at least one surface that defines a mounting element configured to mount the tool holder onto a support surface. The docking frame includes a second mounting interface. The charging module defines a charging surface, and includes an inductive charging device configured to wirelessly charge a battery disposed within power tool or device resting on the charging surface. The holding portion is configured to at least partially engage a geometry of the power tool or device resting on the charging surface to transversely support the power tool or device relative to the first mounting interface.

In one embodiment, the charging module is mounted in the second mounting interface of the docking frame, and the docking frame is mounted in the first mounting interface of the tool holder. In another embodiment, the charging module is mounted in the first mounting interface, and the docking frame can be dispensed with.

In an embodiment, the system further includes a further power tool having at least one of a geometry and a wirelessly rechargeable battery that is different from a geometry and the wirelessly rechargeable battery of the power tool. In another embodiment, the system further includes at least one of a further charging module that corresponds to the different wirelessly rechargeable battery and a further docking frame that corresponds to the different geometry. The charging module and the docking frame are selectably replicable by the further charging module and the further docking frame, respectively.

In a further embodiment, the system additionally includes at least one attachment member, the at least one surface for mounting the tool holder includes at least one mounting element that defines at least one mounting hole, and the support surface for mounting the tool holder defines at least one receiving hole corresponding to the at least one mounting hole. The least one attachment member is configured to be received in both the at least one mounting hole and the at least one receiving hole to mount the tool holder on the support surface.

In an embodiment, one of the at least one surface of the tool holder defines a base of the tool holder, and is configured to mount the tool holder on a support surface that is substantially horizontal. In an embodiment, another of the at least one surface of the tool holder defines a first side of the tool holder, and is configured to mount the tool holder on a support surface that is substantially vertical.

In another embodiment, the system further includes at least one rail attachment member. A further surface of the at least one surface of the tool holder defines a second side of the tool holder opposite the first side, and a mounting hole passes through from the first side to the second side. The at least one rail attachment member is received in the at least one mounting hole such that a portion of the at least one rail attachment member protrudes from at least one of the first side and the second side of the tool holder. The protruding portion is configured to be mounting in at least one mounting rail included on the support surface to mount the tool holder on the support surface.

The support surface can be a mobile structure such as a vehicle, a mobile cart, a workbench, an S-BOXX, or the like.

In one embodiment, the system further includes at least one damping element disposed between the tool holder and the support surface, and configured to damp vibrations in the tool holder. In another embodiment, the tool holder includes an inner wall and an outer wall separated by a gap configured to damp vibrations in the tool holder.

In a further embodiment, the tool holder is configured such that, when mounted on the support surface, the charging surface is at an angle relative to a horizontal plane.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one of ordinary skill in the art to which this document pertains.

Figure 1:
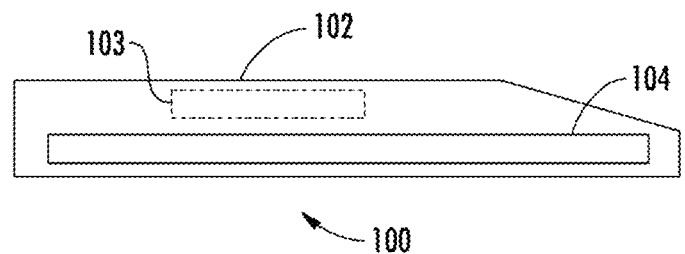
FIG. 1 is a side view of a wireless charging module according to this disclosure.
Figure 2:
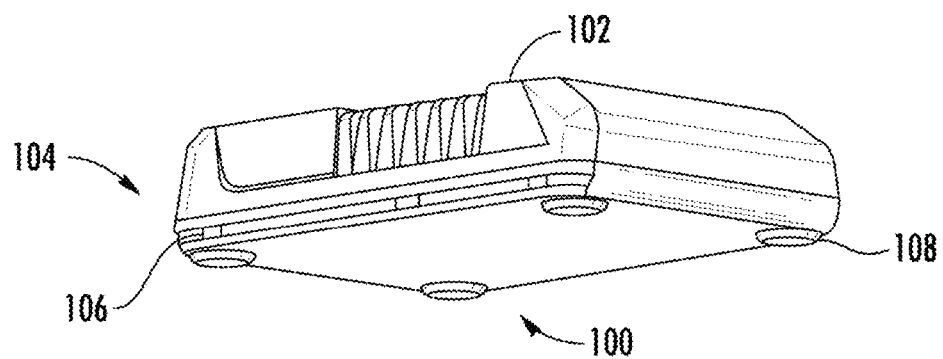
FIG. 2 is a perspective view of the wireless charging module of FIG. 1.

FIG. 1 depicts a side view and FIG. 2 depicts a perspective view of a wireless charging module 100 according to this disclosure. The wireless charging module 100 defines a charging surface 102, and includes an induction charging coil 103, a mounting interface 104, and a plurality of feet 108 (FIG. 2).

The charging surface 102 is formed by a top surface of the charging module 100. The induction charging coil 103 (FIG. 1) is disposed within the charging module 100, and is configured to inductively charge a rechargeable battery placed on or near a charging surface 102. Acceptable wireless inductive battery charging systems are described in U.S. Pat. No. 5,959,433, WO2014/096052, WO2014/096037, and WO2014/096048. Other types of conventional inductive charging systems are also contemplated. For example, the wireless charging module 100 supports Qi inductive charging or the like.

The mounting interface 104 is disposed on the lateral sides of the charging module 100, and is configured to removably mount the charging module 100 within another structure, such as a docking frame or tool holder as discussed below, to enable rigid support of the charging module 100 on a surface, wall, tool box, vehicle, cart, work surface, or the like. As illustrated in FIG. 2, in this embodiment the mounting interface 104 includes a rail 106 configured to removably mate with a receiving interface of the other structure. In other embodiments, the mounting interface 104 can include one or more of, for example, a rail, a snap structure, a roller, or other acceptable removable mounting structures. In another embodiment, the mounting interface 104 includes a damping material configured to provide at least partial damping between the charging module 100 and the other structure.

The plurality of feet 108 are disposed on a bottom of the charging module 100 opposite the charging surface 102, and are configured to provide at least partial damping and/or restraint against motion. For example, the plurality of feet 108 can provide at least partial damping relative to the other structure housing the charging module 100, or can provide at least partial damping when the charging module 100 is not mounted in another structure and is resting directly on an unsecured surface. The feet 108 can include rubber footing, grips, or other structure configured to arrest motion or provide damping.

The charging module 100 can be used to charge a removable battery that is not connected to a tool but is instead placed directly on the charging surface 102, or can be used to charge a battery configured to remain within a tool during charging. In some cases, a battery within a tool may be spaced apart from a bottom surface of the tool. Thus, the optimal position for a battery for wireless charging via the induction charging coil 103 may be on or near the charging surface 102, or at a distance spaced apart from the charging surface 102. In an embodiment, the charging module 100 is configured to adjust the optimal charging location based on the tool or device placed on the charging surface 102.

The charging module 100 is usable to charge a variety of sizes and powers of batteries. For example, the battery can include a Lithium ion battery, a Lithium air battery, a Lithium metal battery, a Lithium sulfur battery, a metal-air battery, or other acceptable types of rechargeable batteries. The charging module 100 can also be used to charge multiple batteries or multiple tools at once In an embodiment, the charging module 100, in addition to being configured to transfer energy to charge the tool and/or battery, is further configured to transfer energy to charge at least one non-power tool device such as, for example, a battery tester, a vehicle diagnostic system, a wireless device, a wearable device, a mobile device, or a device for a vehicle.

Because the induction charging coil 103 enables wireless charging, the charging module 100 does not need a physical contact point for electrically connecting the battery/tool to the charging module. In conventional chargers, contact points can become obstructed by debris, or can be damaged such as by wear or impact, which can negatively impact the performance of the charger. Many types of contact points also require that the battery or tool is removably coupled to the charger, which necessitates a decoupling action before the battery/tool can be removed. By eliminating contact points, the charging module 100 not only removes the risk of debris or impact affecting the performance of charging a battery, but also enables maintaining a tool in an always-ready condition where the tool is easily removable from the charging module 100 without requiring any detachment or decoupling.

The charging surface 102 of the charging module 100 can be used as a resting surface on which the tool may be placed when not in active use. In an exemplary use case, a user performing a repetitive drilling operation can iterate between operating a power drill with a rechargeable battery, and inserting a member into a hole resulting from the drilling operation. When using a conventional rechargeable drill, the battery is continually drained during operation, and continues to drain or at best holds steady when not in use. According to this disclosure, when inserting the member into the hole, the user can place the drill on the charging surface 102 of the charging module 100, and then the user can retrieve the drill for the subsequent drilling operation. In this way, the battery of the drill is at least partially recharged each time it is set aside while the user inserts a member. Because placing and removing the drill on the charging surface 102 does not require a coupling or uncoupling action, the drill can be placed and recovered without interruption to the user's workflow. Additionally, because the drill is charged whenever it is resting on the charging surface 102, the time over which the drill can be operated without stopping to recharge or replace the battery is extended relative to conventional charging systems.

In one embodiment, the charging module 100 further includes an electric plug (not shown) configured to connect the charging module 100 to an electrical power source, such as a wall socket, car power outlet, power converter, etc. In an embodiment, the charging module also includes a charging control unit (not shown) that is configured to operate the induction charging coil 103 to control a charging operation. Such a charging control unit can include a wireless communication device for communicating with, for example, a battery, a tool, a mobile device, or the like such as an RF antenna, near field communication (NFC), WiFi, Bluetooth, or the like. For example, the charging control unit can be configured to communicate with the battery and/or the tool to charge the battery based at least in part upon a charge level and/or state of the battery.

Conventional wireless chargers are inefficient or otherwise unusable for charging power tools in mobile applications since conventional chargers are neither secured to a supporting surface, nor do they secure the tool itself from unintended motion. Wireless charging is optimally efficient when the tool is properly located relative to the charging module. In an example, the device is desirably charged while the user is travelling in a vehicle, and is placed on a charging module 100 that is positioned in the vehicle. During travel, the charging module 100 and the tool are subject to road vibration conditions and other motion. Such motions can cause the tool and/or the charging module 100 to be moved such that the tool is not being charged or is not being charged efficiently. The tool and/or the charging module 100 might also be damaged from impacts due to motion. In another example, the charging module is mounted on a wheeled work cart, and is subject to similar motion. In a further example, the charging module is situated in a work site with heavy vibration, a risk of being unintentionally moved or impacted, or in an environment otherwise presenting a risk of de-locating or damaging the tool and/or the charging module.

Figure 3:
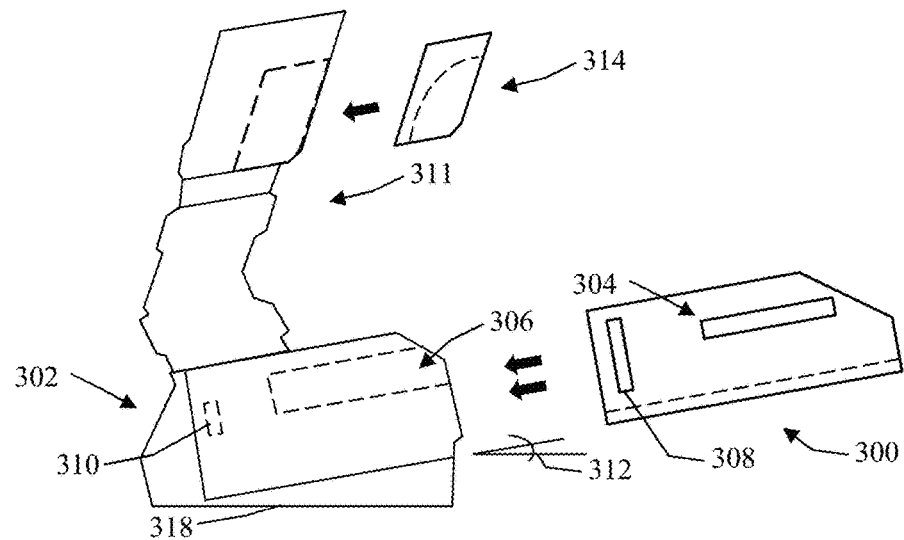
FIG. 3 is a side view of a tool holder for mounting a docking frame and the charging module of FIG. 1 according to this disclosure.

As discussed above, mounting the charging module 100 on another structure can be beneficial for securing the battery/tool during charging or between periods of use. FIG. 3 illustrates a side view of a docking frame 300 configured to be mounted in a tool holder 302, and FIG. 4 illustrates an exploded perspective view of the docking frame 300 and tool holder 302 along with a charging module 100.

Figure 4:
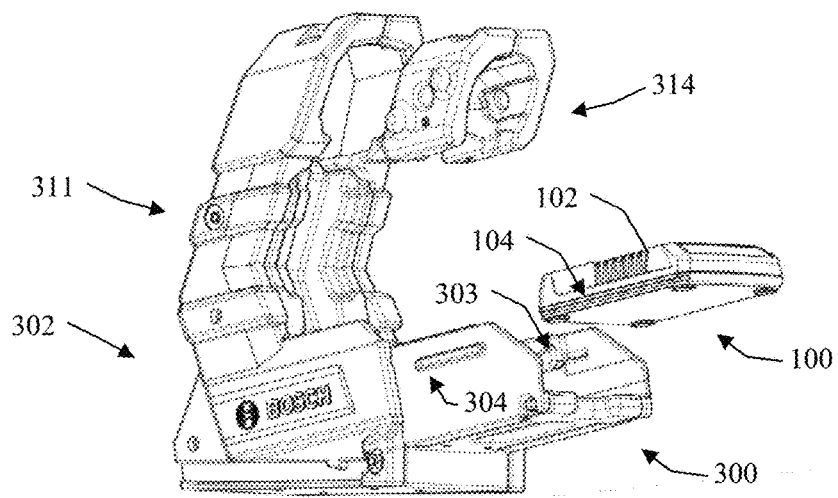
FIG. 4 is an exploded perspective view of a tool holder, docking frame, and charging module of FIG. 3.

The docking frame 300 includes a receiving interface 303 configured to removably receive the mounting interface 104 of the charging module 100 (FIG. 4). In this embodiment, the geometries of the mounting interface 104 and the receiving interface 303 are configured to engage with each other, such as via a nub-and-slot interface, or the like.

In another embodiment, the receiving interface 303 has a geometry that is at least partially complementary to geometry of the mounting interface 104 of the charging module 100. For example, one of the receiving interface 303 and the mounting interface 104 can include a protruding rib, and the other can include a rib-shaped recession configured to slidingly receive the rib. Other types of interfaces are also contemplated, including roller interfaces, and snap interfaces, as described in further detail below.

The receiving interface 303 can also include a stop member (not shown) configured to limit an extent to which the charging module 100 can be inserted into the docking frame 300. The stop member can include, for example, a ridge protrusion, a back-wall, a cross-member, and a ridge located on a rail of the receiving interface 303

In addition to a receiving interface configured to receive a charging module 100, the docking frame 300 includes a second mounting interface 304 that enables the docking frame to be mounted in the tool holder 302. In this embodiment, the docking frame 300 additionally includes an additional stop member 308 that limits an extent that the docking frame 300 is mountable within the tool holder 302, as discussed below.

The tool holder 302 includes a second receiving interface 306, a further stop member 310, and a tool holder portion 311.

The second receiving interface 306 is configured to engage with the second mounting interface 304 to mount the docking frame 300 within the tool holder 302 in a manner similar to the engagement between the mounting interface 104 and receiving interface 303 of the charging module 100 and docking frame 300. For example, in this embodiment, the second mounting interface 304 is a protruding rail that is configured to be slidingly received in, for example, a slot (not shown) of the second receiving interface 306, but other types of mounting interfaces are also contemplated.

The second receiving interface 306 is oriented at an angle 312 (FIG. 3) relative to the base of the tool holder 302 such that the side of the second receiving interface 306 facing away from the further stop member 310 is elevated compared to the opposite side of the second receiving interface 306. Due to the angle 312, the docking frame 300, when mounted via the second receiving interface 306, is urged by gravity to slide down along the second receiving interface 306 toward the tool holding portion 311. The further stop member 310 is configured to engage with the additional stop member 308 of the docking frame 300 to delimit a range of motion of the docking frame 300 along the slot 313 into the tool holder 302.

The mounting interfaces 104 and 304 and the receiving interfaces 303 and 306 are configured to be substantially parallel with each other in a mounted position. Since the docking frame 300 is oriented at the angle 312, the charging surface 102 of the charging module 100 is thus also oriented at the angle 312 when the charging module 100 is mounted in the docking frame 300. In other words, the charging module 100 is oriented such that the charging surface 102 slopes downward toward the tool holding portion 311.

In another embodiment, (not shown) the charging module 100 may be directly mounted in the second receiving interface 306. For example, a charging module may be of a size that is too large for the docking frame 300, and thus the mounting interface of the large size charging module is configured to directly engage the second mounting interface 306.

The tool holder portion 311 extends upwards from a region of the second receiving interface 306 proximate to the further stop member 310, and is configured to at least partially support the body of a tool disposed on the charging surface 102. Because the charging surface 102 is oriented at the angle 312, the tool is urged by gravity into the tool holder portion 311. The magnitude of the angle 312 is selected to enable a user to insert and remove the tool from the tool holder portion 302 via a swiping motion that results in a bottom surface of the tool sliding against the charging surface 102 so as to clear any debris disposed thereon. The tool holder 311 thus acts as a transverse support for a device resting on the sloped charging surface 102.

The tool holding portion 311 is configured to counteract motion, such as road vibrations, so that the tool is kept optimally positioned relative to the charging surface 102 for charging the battery. Advantageously, the tool holding portion 311 is configured to apply a load to the tool that acts to keep the battery within the tool optimally positioned relative to the charging surface 102. The load applied by the tool holding portion 311 is counteracted by the charging surface 102 of the charging module. When a tool is placed on the charging module 100 mounted in the docking frame 300 and tool holder 302 as illustrated in FIGS. 3 and 4, the load applied by the tool holding portion 311 and the counteraction of the charging surface 102 act compressively on the tool in order to securely hold the tool in the tool holder at an optimal location for charging the tool via the charging module 100.

The tool holding portion 311 further includes a soft insert structure 314 configured to receive the tool. The soft insert structure 314 is advantageously a removable structure as illustrated in FIGS. 3 and 4, but in some embodiments, the soft insert structure 314 is integral with the tool holding portion 311. In such embodiments, different soft insert structures 314 can be used to mount different tools in the tool holder 302.

The soft insert structure 314 is further configured to have an interference fit with the tool, whereby the interference fit acts as at least a part of a source of the load acting on the tool. While a hard insert structure may also be acceptable to receive the tool in the tool holding portion 311, the soft insert structure 314 includes a soft material that provides damping in restraining the tool. In one embodiment, the soft insert structure 314 includes a hard surface or shell configured to mate with the tool holding portion 311 and a soft receiving area configured to receive the tool.

Figure 5:
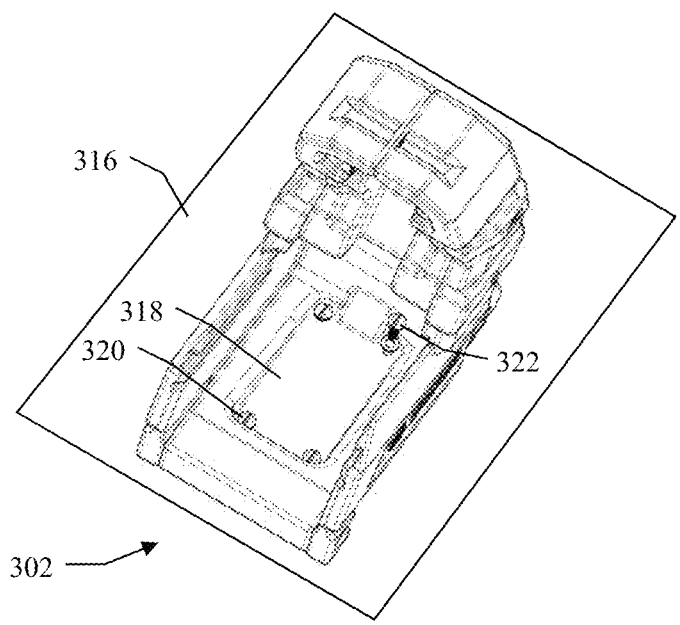
FIG. 5 is a perspective view of an exemplary tool holder mounted to a surface according to the disclosure.

In order to counteract motions, such as road vibrations, it is desirable to mount the tool holder 302 onto a support surface. FIG. 5 illustrates a perspective view of the tool holder 302 mounted on a surface 316. The tool holder 302 includes a bottom attachment surface 318 having a plurality of clearance holes 320 configured to receive attachment members 322, such as screws, bolts, clips, pins, etc. The surface 316 can be, for example, a truck bed, a work surface, a cart, a counter or table top, a floor, or a substantially horizontal surface of any other structure.

Figure 6:
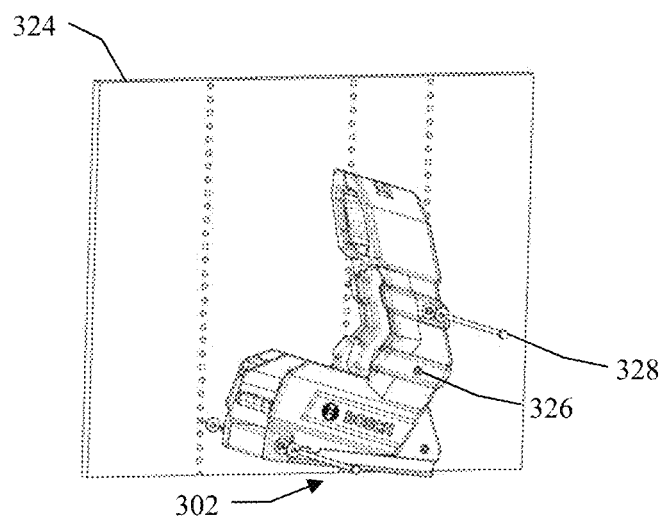
FIG. 6 is a perspective view of a tool holder mounted to a vertical surface according to this disclosure.

It may also be desirable to vertically mount the tool holder 302 onto a vertical surface. FIG. 6 illustrates a perspective exploded view of the tool holder 302 mounted on a vertical surface 324. The tool holder 302 additionally includes a plurality of side mounting holes 326 configured to receive side attachment members 328 such as bolds, screws, clips, pins, etc. Advantageously, the tool holder 302 can be mounted at different orientations. In other words, the tool holder 302 can be mounted to the vertical surface 324 at a desired rotation about an axis normal to the vertical surface.

Figure 7:
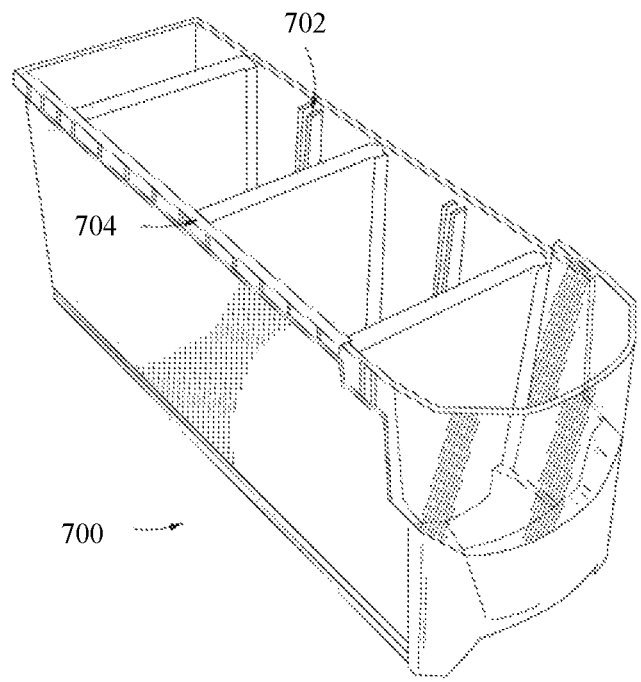
FIG. 7 is a perspective image of an exemplary rail storage device according to this disclosure.

It may also be desirable to mount the tool holder on vertical rails. An acceptable storage system with vertical rails is the S-BOXX produced by Sortimo®. FIG. 7 illustrates a perspective view of an exemplary S-BOXX 700. The S-BOXX 700 includes a plurality of vertical rails 702. In an embodiment, rail attachment members, such as pins, screws, etc., are inserted into the side mounting holes 326 similarly to how the side attachment members 328 are inserted therein as illustrated in FIG. 6. An end portion of the rail attachment member extends beyond the tool holder 302 on each side of the side mounting holes 326. The end portion of the rail attachment members are configured to be inserted into the vertical rails 702, e.g., in place of separating walls 704, such that the tool holder 302 is held captive in the S-BOXX 700. In some embodiments, a locking member holds the end portions of the rail attachment members in place within the vertical rails 702. In some embodiments, a bottom of the tool holder 302 is additionally secured to the S-BOXX 700 in the manner described above with regard to FIG. 5.

In some embodiments, the clearance holes 320 and/or the side mounting holes 326 include a sleeve configured to provide reinforcement and/or protect the structure of the tool holder 302. The sleeve can be, for example, a metal sleeve or lining extending over at least a portion of an interior of the holes 320, 326.

In some embodiments, a mounting bracket, mounting bar, or other attachment structure is disposed between the attachment surface 318 and the surface 316, or between the tool holder 302 and the vertical surface 324. In some embodiments, a damper configured to counteract vibration forces, such as a viscoelastic material, a foam, a spring, a particle damping material, or other types of dampening or vibration isolating structures is disposed between the tool holder 302 and the surface 316 and/or vertical surface 324.

Figure 8:
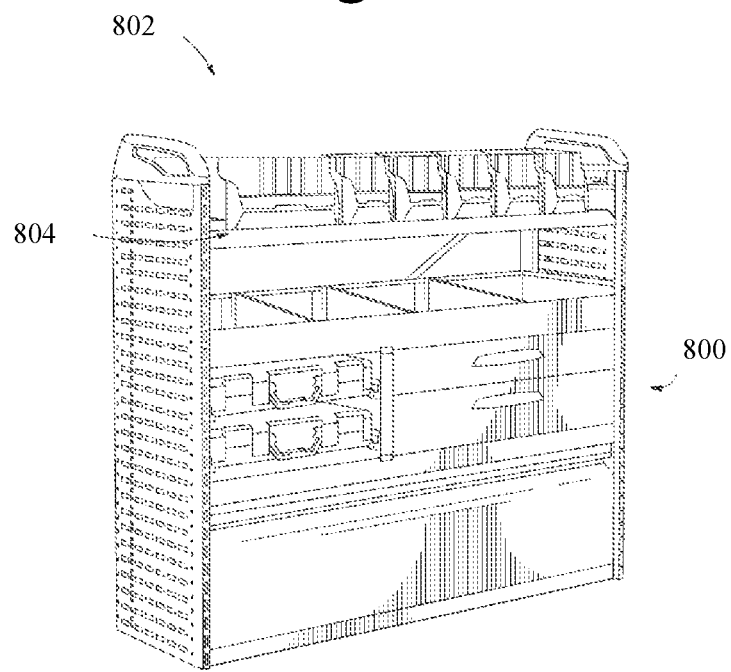
FIG. 8 is a perspective cross section view of the tool holder according to this disclosure.
Figure 9:
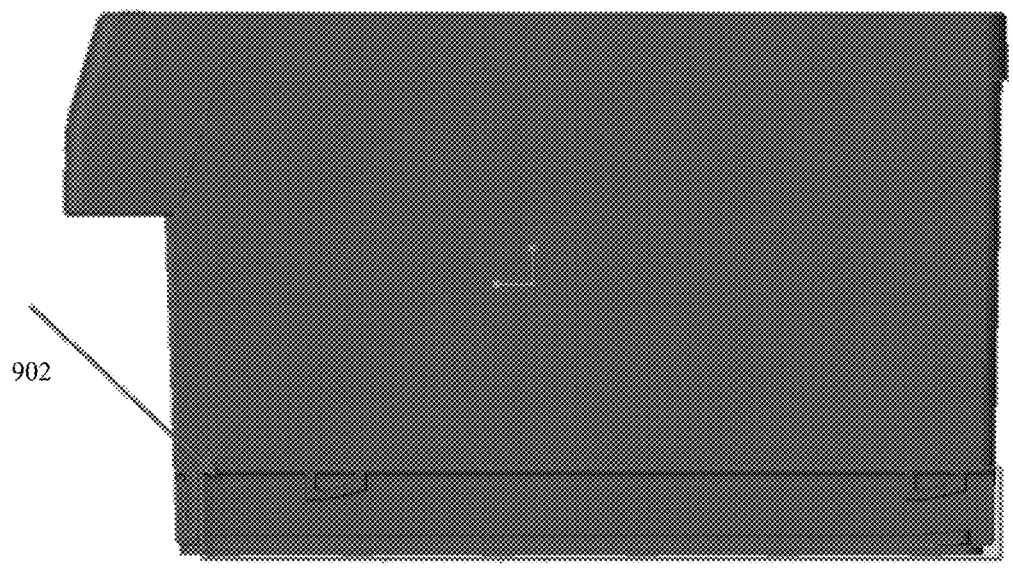
FIG. 9 is a front view of a tool holder having a pushing mechanism according to this disclosure.
Figure 10:
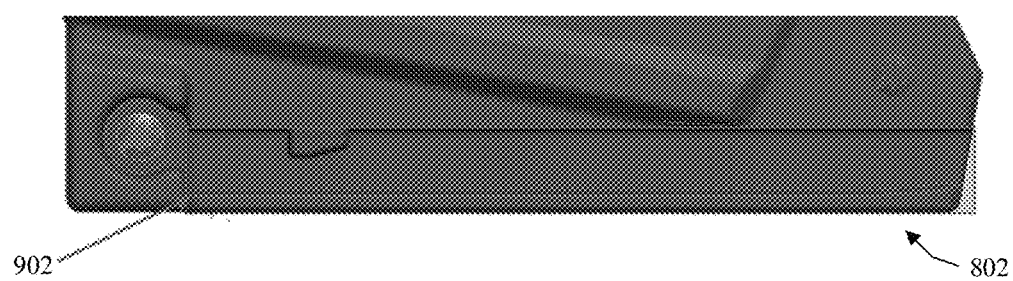
FIG. 10 is a front view of another embodiment of a tool holder having a pushing mechanism according to this disclosure.

It may also be desirable to mount the tool holder on horizontal rails. FIG. 8 illustrates an example of a tool cabinet 800 that includes a plurality of S-BOXX 802 holders mounted via horizontal rail mounts 804, and FIG. 9 illustrates a side view of one of the S-BOXX holders 802 that has a horizontal rail 902 that is configured to mount the S-BOXX holder 802 in the horizontal rail mount 804 of the tool cabinet 800 in FIG. 8. FIG. 10 illustrates a detail side view of a bottom portion of the tool holder 802 and rail 902 that is configured to mount the tool holder 802 on a horizontal rail mount 804 illustrated in FIG. 8. By mounting the tool holder into an S-BOXX holder 802, the tool holder 802 can be secured to a variety of surfaces, such as the tool cabinet 800, whereby the tool holder rests in close proximity to other tools or materials utilized during a job.

Figure 11:
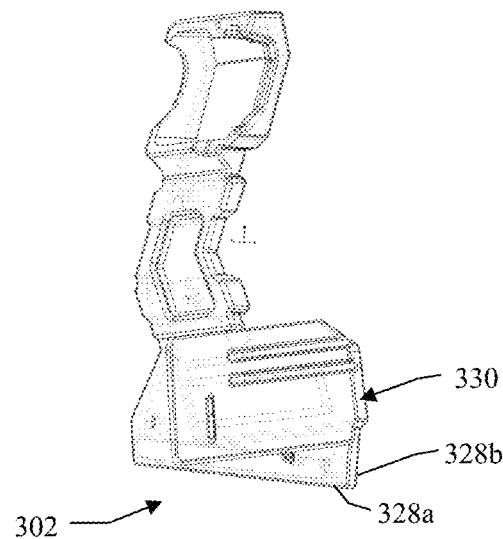
FIG. 11 is a side view of a tool holder having a strap mechanism according to this disclosure.

Because not only the tool holder according to this disclosure, but also the tool mounted therein may be subjected to various vibration forces, such as road vibrations, or vibrations from other sources such as heavy machinery, and additional vibration damping may be beneficial. In the embodiment illustrated in FIG. 11, the tool holder 302 has a double-walled structure with an inner surface 328a and an outer surface 328b. A gap 330 between the inner surface 328a and outer surface 328b provides vibrational damping for the tool holder 302. In some embodiments, the gap 330 is filled with air, although filling the gap 330 with other materials such as a vibration damping material is also contemplated. In one aspect, the tool holder 302 has a blown molded structure configured to damp vibrations. In an example, the tool holder 302 can include one or more parts formed by a blow molding process and having a structure that provides structural dampening.

As described above, the tool holder 302 holds the tool in place relative to the charging module 100 to counteract external motions and vibrations. However, it is also desirable that installation and removal of the tool to and from the tool holder 302 is optimized so as not to interfere with ready use of the tool. In particular, it is desirable that a user be able to easily insert or remove the tool with one hand. Such one-handed manipulation is enabled by, for example, the angle 312 (FIG. 3) which enable the swiping motion described above, and also by adjusting an amount of resistance of the tool holder 302 exerts when installing or removing the tool. As described above, the amount of resistance can be adjusted by adjusting the fit of the soft insert structure 314. The amount of resistance can also be adjusted by adjusting a thickness of the material used to form the tool holder 302 and/or the docking frame 300. In another example, the amount of resistance can be adjusted by forming the tool holder 302 with a shape configured to form a seal or pressure fit with the tool.

Because the efficiency of the charging of the battery is based at least in part upon the location of the battery with respect to the charging module 100, it may be desirable to further restrain the tool and/or docking frame 300 so as to facilitate an alignment between the battery and the charging module 100. It may also be desirable for a tool holder to be configured to accommodate batteries and/or charging modules of variable size. Additionally, applying a load that urges the charging module 100 against the tool can be used to adjust the amount of resistance for installing and removing the tool as described above, as well as to keep the tool aligned with the charging module 100.

Figure 12:
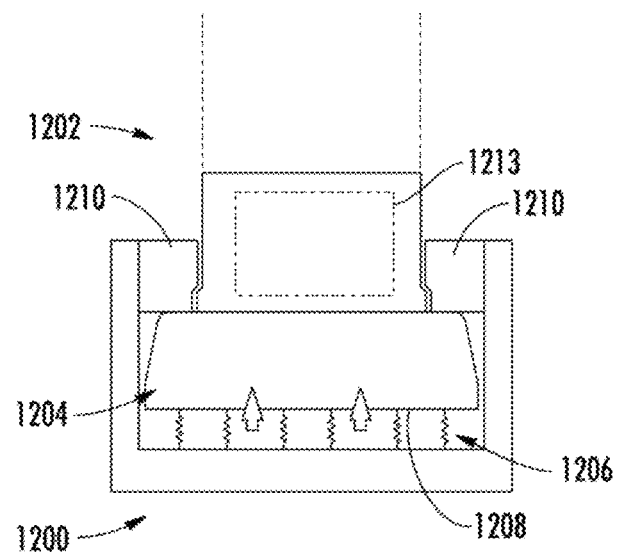
FIG. 12 is a side view of a tool holder having a clamp mechanism according to this disclosure.

FIG. 12 illustrates a front view of a tool holder 1200, a tool 1202 mounted in the tool holder 1200, and a charging module 1204 mounted in the tool holder 1200. The tool holder 1200 further includes stops 1210 and a pushing mechanism 1206. The pushing mechanism is configured to push on a bottom surface 1208 of the charging module 1204 such that the charging module 1204 is urged against the tool 1202. In an example, the pushing mechanism 1206 includes a spring and/or spring plate. The stops 1210 hold the tool 1202 in place and to counteract a force of the charging module 1204 against the tool 1202. The tool 1202 is thus held in a position for optimal charging of a battery 1213 disposed therein The stops 1210 also are configured to act as an indicator to a user that the battery is properly aligned with the charging module 1204, i.e., when the stops 1210 are engaged by the tool 1202, the battery within the tool 1202 is properly aligned. In other embodiments, stops similar to the stops 1210 can be disposed on the charging module and configured to engage with the tool 1202, disposed on a docking frame mounted in the tool holder 1200, or can be disposed on the tool 1202 and configured to engage with the charging module 1204, a docking frame, or the tool holder 1200.

Figure 13:
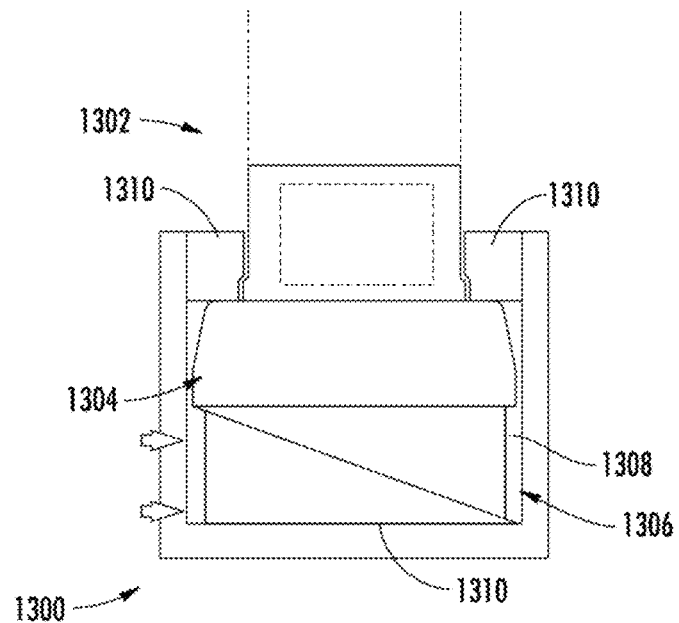
FIG. 13 is a side view of a tool holder having a spring member according to the disclosure.

FIG. 13 illustrates a front view of another embodiment of a tool holder 1300 configured to urge the charging module 1304 against the tool 1302. Rather than including a spring and/or a spring plate, the pushing mechanism 1306 includes a wedge 1308 and a pushing wedge block 1310. The pushing wedge block 1310 can be mounted on a threaded rod, for example, and can be pushed against the wedge 1308, for example, by adjusting the threaded rod, causing the wedge 1308 to push the charging module 1304 against the stops 1308 and the tool 1302.

Pushing devices, such as the pushing mechanisms 1206, 1306 described above, and other acceptable pushing mechanisms, can also be used to adjust for different size batteries, tools, and/or charging modules.

Figure 14:
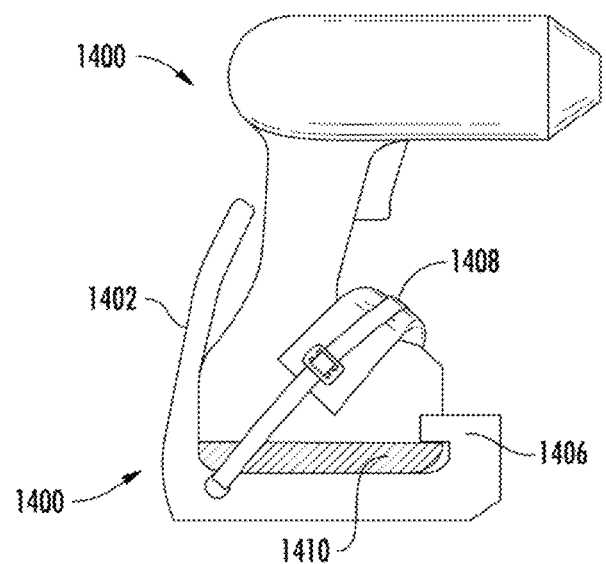
FIG. 14 is a perspective image of a tool cabinet that includes a rail storage device.

FIG. 14 illustrates another embodiment of a tool holder 1400 according to this disclosure. The tool holder 1400 includes a back member 1402 configured to apply a load to the tool 1400 mounted within the tool holder 1400 that acts to keep the tool 1400 optimally positioned related to the charging module 1410. The tool holder 1400 further includes a front stop 1406 configured to engage with at least one of the tool 1400 and the charging module 1410 and limit an extent of motion of at least one of the tool 1400 and the charging module 1410, and a strap 1408 configured to hold the tool 1400 in place. The strap 1408 is additionally configured to be tightened so as to apply a load that urges the tool 1400 against the charging module 1410.

Figure 15:
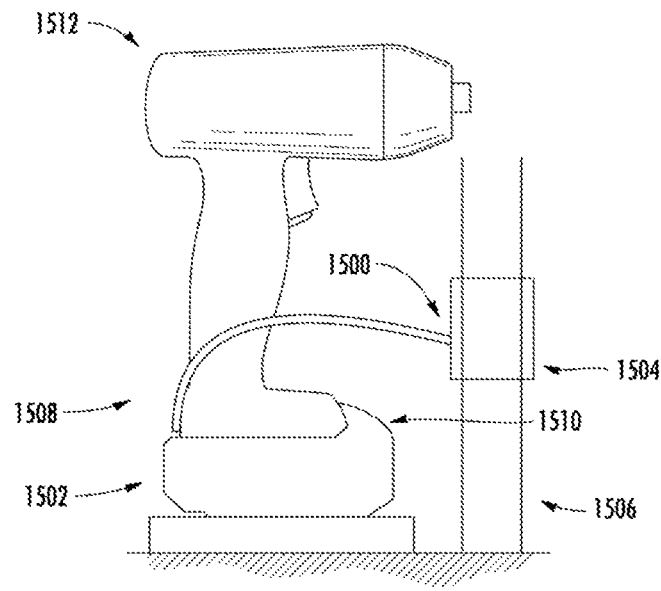
FIG. 15 is a side view of a storage unit configured to be mounted within the rail storage device of FIG. 14.

FIG. 15 illustrates a further embodiment of a tool holder according to the disclosure. A clamp mechanism 1500 is configured to urge the tool 1512 against the charging module 1502, and includes a clamping end 1504 configured to engage with a restraining member 1506 such as a rod, pole, bar, pipe, etc., and a gripping end 1508 configured to engage with the tool 1512. In the embodiment, the gripping end 1508 includes gripping tines, but other types of gripping ends, such as a loop connection, clip connection, and pin connection are also contemplated. The charging module 1502 additionally includes a lip 1510 configured to hold the tool 1512 captive on the charging module 1502 in conjunction with the clamp mechanism 1500. The clamp mechanism is advantageously configured to have an adjustable length such that a variety of thickness of the tool 1512 and charging module 1502 can be accommodated.

Figure 16:
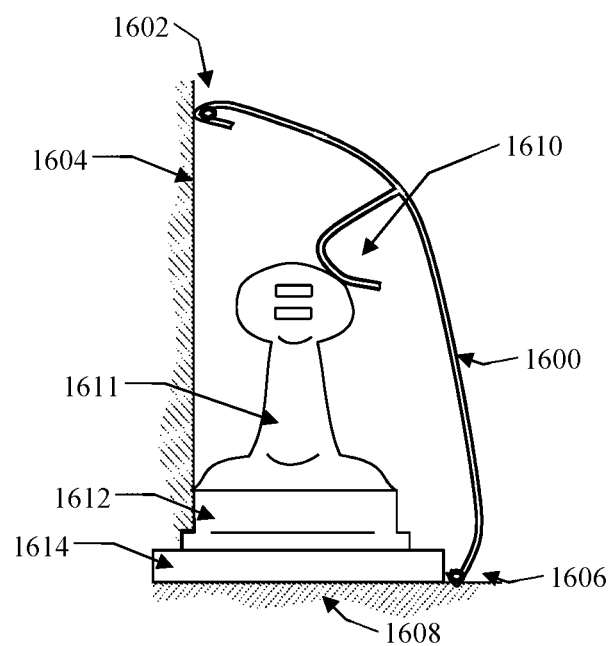
FIG. 16 is a detail side view of a tool holder according to the disclosure that is configured to be mounted in the rail storage device of FIG. 14.

FIG. 16 illustrates another embodiment according to the disclosure. A spring member 1600 is affixed at a first end 1602 to a side surface, such as a plastic side mounting member 1604, and at a second end 1606 to a plastic bottom mounting member 1608. In an example, the spring member 1600 is a metal strapping spring or a wire-form spring. The spring member 1600 further includes a transverse spring element 1610 configured to urge the tool 1611 and/or the battery 1612 against the charging module 1614. In an example, the spring element 1610 is a folded over-spring portion.

In a further embodiment (not shown) the docking frame 300 and/or the tool holder 302 includes a cord guide configured to guide a power cord out from the charging module, through the docking frame 300 and/or tool holder 302, such that the power cord to be connected to a power source is unobstructed by the docking frame 300 and/or tool holder 302.

It is contemplated that different tool holders and docking frames may be configured to be used with different tools, and so too may different charging modules be configured to be used with different batteries and with different docking stations. Thus, in a further embodiment (not shown), a plurality of different tool holders are configured to be used with different docking frames and charging modules of different sizes and powers via common interfaces.

In an example, a first docking frame is mounted within a tool holder, and houses a first charging module. The first tool holder and the first charging module are configured to work with a first tool. When a second tool is desirably charged, the first docking frame is removed from the tool holder, and a second docking frame housing a second charging module is inserted therein, wherein the second charging module is configured to charge the second tool, and wherein the second docking frame has a mounting interface configured to engage with the receiving interface of the tool holder. In other words, tool holders, docking frames, and charging modules may be mixed and matched as desired due to common mounting and receiving interfaces.

In one example, a charging module is paired with a wireless device by a communication protocol such as Bluetooth. An app or software for controlling the charging module or monitoring an event of the charging module is installed to the wireless device. When a device such as a power tool, a vehicle diagnostic device, a vehicle battery, or other wireless device such as tablet, coupled to the charging device is charging or has fully charged, a transmitter or a transceiver within a charging device sends information wirelessly to the wireless device for indication of the status of the charging event, such as by a display on the wireless device that is configured to show information indicative of one or more devices are in the charging event, or by a speaker or buzzer configured to output an audio signal indicative of information with respect to the charging event. Other types of indication are also contemplated.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A wireless charging system, comprising:
   a tool holder that includes:
      a mounting interface; and
      a holding portion that extends from an end region of the mounting interface; and
      at least one mounting hole that passes from a first side of the tool holder through to a second side of the tool holder opposite the first side;
   at least one rail attachment member received in the at least one mounting hole such that a portion of the at least one rail attachment member protrudes from at least one of the first side and the second side of the tool holder; the portion of the at least one rail attachment member protruding out from the tool holder configured to be mounted in at least one mounting rail to mount the tool holder on the at least one mounting rail; and a charging module that defines a charging surface, that is configured to be mounted in the mounting interface of the tool holder, and that includes an inductive charging device configured to wireless charge a device resting on the charging surface;

the holding portion of the tool holder having a shape configured to at last partially engage a geometry of the device such that the holding portion acts as a transverse support for the device relative to the mounting interface.

2. The system of claim 1, wherein the support surface is a surface of a mobile structure.

3. The system of claim 1, further comprising at least one damping element configured to be positioned between the tool holder and the support surface as the tool holder is mounted to the support surface.

4. The system of claim 1, wherein the tool holder is configured to mount the charging module such that the charging surface is at an angle relative to a horizontal plane.

5. The system of claim 1, wherein the tool holder includes an inner wall and an outer wall separated by a gap configured to damp vibrations in the tool holder.

6. The system of claim 1, further comprising at least one attachment member, wherein:

the mounting element includes at least one mounting hole;

the support surface defines at least one receiving hole corresponding to the at least one mounting hole; and the at least one attachment member is configured to be received in both the at least one mounting hole and the at least one receiving hole to mount the tool holder on the support surface.

7. The system of claim 1, wherein one of the at least one surface of the tool holder defines a base of the tool holder, and is configured to mount the tool holder on a support surface that is substantially horizontal.

8. The system of claim 1, wherein a first of the at least one surface of the tool holder defines a first side of the tool holder, and is configured to mount the tool holder on a support surface that is substantially vertical.

9. The system of claim 8, wherein a second of the at least one surface of the tool holder defines a base of the tool holder, and is configured to mount the tool holder on a support surface that is substantially horizontal.

10. A wireless charging system, comprising:

a tool holder that includes:
 a first mounting interface; and
 a holding portion that extends from an end region of the mounting interface; and
 at least one surface that defines a mounting element configured to mount the tool holder onto a support surface;

a docking frame configured to be removably mounted in the first mounting interface, the docking frame including a second mounting interface;

a charging module that defines a charging surface, that is configured to be removably mounted in the second mounting interface, and that includes an inductive charging device; and a power tool that includes a wirelessly rechargeable battery, and that is configured to be removably disposed on the charging surface of the charging module such that the holding portion at least partially transversely supports the power tool relative to the first mounting interface.

11. The system of claim 10, further comprising:

a further power tool having at least one of a geometry and a wirelessly rechargeable battery that is different from a geometry and the wirelessly rechargeable battery of the power tool.

12. The system of claim 11, further comprising at least one of:

a further charging module that corresponds to the different wirelessly rechargeable battery; and a further docking frame that corresponds to the different geometry;

the charging module and the docking frame being selectably replicable by the further charging module and the further docking frame, respectively.

13. The system of claim 11, further comprising at least one attachment member, wherein:

the mounting element includes at least one mounting hole;

the support surface defines at least one receiving hole corresponding to the at least one mounting hole; and the at least one attachment member is configured to be received in both the at least one mounting hole and the at least one receiving hole to mount the tool holder on the support surface.

14. The system of claim 11, wherein one of the at least one surface of the tool holder defines a base of the tool holder, and is configured to mount the tool holder on a support surface that is substantially horizontal.

15. The system of claim 11, wherein a first of the at least one surface of the tool holder defines a first side of the tool holder, and is configured to mount the tool holder on a support surface that is substantially vertical.

16. The system of claim 15, wherein a second of the at least one surface of the tool holder defines a base of the tool holder, and is configured to mount the tool holder on a support surface that is substantially horizontal.

17. The system of claim 15, further comprising at least one rail attachment member, wherein:

a second surface of the at least one surface of the tool holder defines a second side of the tool holder opposite the first side;

the mounting element includes at least one mounting hole that passes from the first side through to the second side;

the at least one rail attachment member is received in the at least one mounting hole such that a portion of the at least one rail attachment member protrudes from at least one of the first side and the second side of the tool holder; and the portion of the at least one rail attachment member protruding out from the tool holder is configured to be mounted in at least one mounting rail included on the support surface to mount the tool holder on the support surface.

18. The system of claim 11, wherein the support surface is a surface of a mobile structure.

19. A wireless charging system, comprising:

a charging module that includes:
 a charging surface; and
 an inductive charging device configured to wirelessly charge a device resting on the charging surface;

a tool holder having a double-walled structure that is formed by an inner wall and an outer wall separated by a gap and that is configured to damp vibration of the tool holder, the tool holder including:
 a mounting interface configured to removably receive the charging module;
 a holding portion that extends from an end region of the mounting interface, and that has a shape configured to at least partially engage with a geometry of the device resting on the charging surface of the charging module and act as a transverse support for the device relative to the mounting interface; and at least one surface that defines a mounting element configured to mount the tool holder onto an external support surface.

20. The system of claim 19, wherein the tool holder further includes a vibration damping material disposed in the gap between the inner wall and the outer wall.

* * * * *